United States Patent [19]
Wheeler et al.

[11] Patent Number: 6,045,238
[45] Date of Patent: Apr. 4, 2000

[54] ILLUMINATION ASSEMBLY FOR AN OPTICAL VIEWING DEVICE

[75] Inventors: Robert C. Wheeler; Michael J. Pileski, both of Skaneateles, N.Y.

[73] Assignee: Welch Allyn Inc., Skaneateles Falls, N.Y.

[21] Appl. No.: 09/169,600

[22] Filed: Oct. 9, 1998

[51] Int. Cl.[7] ...................................................... F21V 7/00
[52] U.S. Cl. ........................... 362/247; 362/30; 362/277; 362/278; 362/279; 362/280; 362/319; 235/435; 235/454; 235/462
[58] Field of Search ............................... 362/30, 240, 245, 362/247, 277–280, 304, 307, 319, 346, 800; 235/472, 462, 454, 435

[56] References Cited

U.S. PATENT DOCUMENTS 5,585,616  12/1996  Roxby et al. ............................. 235/472

*Primary Examiner*—Cassandra Spyrou
*Assistant Examiner*—Craig Curtis
*Attorney, Agent, or Firm*—Wall Marjama Bilinski & Burr

[57] ABSTRACT

An illumination assembly for an optical viewing device that includes an optical subassembly for viewing an illuminated object plane. The illumination assembly includes a base member having an imaging window formed therethrough, a plurality of LEDs fixed to the base member in a plane substantially coplanar with the imaging window for projecting light upwardly away from the base member, and a non-mirrored reflector for redirecting light emitted from the LEDs back through the imaging window toward the object plane to illuminate the object plane. The non-mirrored reflector is positioned so as to house the LEDs, and includes a central aperture for providing optical communication between the illuminated object plane and the optical subassembly.

25 Claims, 2 Drawing Sheets

ILLUMINATION ASSEMBLY FOR AN OPTICAL VIEWING DEVICE

FIELD OF THE INVENTION

The present invention relates to an illumination assembly for an optical viewing device. The assembly is particularly useful for illuminating the object plane in systems such as video magnifiers, bar code readers, CMOS cameras, microscopes, and the like.

BACKGROUND OF THE INVENTION

Various types of optical viewing devices, such as video magnifiers, bar code readers, CMOS cameras, microscopes, and the like, require an illumination source to illuminate the object plane to be viewed. Typically the illumination source includes one or more point light sources (e.g. LEDs) that are arranged to impinge light directly on the object plane. Alternatively, the LEDs are directed against a mirrored surface, which in turn re-directs the light against the object plane.

One problem with the direct illumination system described above is that the illumination source shines directly on the object plane to be viewed. This results in certain areas of the imaged field of view appearing brighter than other areas due to direct reflection of the light source back into the imager, especially when the object plane is reflective (e.g., glossy-surface paper). Uniform brightness across the entire field of view would provide easier viewing of the object plane.

One problem with the indirect/mirrored illumination system described above is that an image of the LEDs and/or the imager itself often is reflected back into the imager when viewing a reflective object place. This in turn detracts from the viewing quality of the object plane.

Yet another problem with known illumination assemblies in general is that the illumination source is typically made up of LEDS, which often are either green or red. While such colored LEDs work well when imaging standard black-on-white objects, they present major problems when used with colored objects. For example, red-printed text cannot be imaged successfully using red LEDs as the illumination source. This same problem occurs with green text and green LEDs.

SUMMARY OF THE INVENTION

It is an object of the present invention to provide an illumination assembly that overcomes all of the problems of the prior art discussed above.

In accordance with one embodiment of the present invention, an illumination assembly is provided for an optical viewing device that includes an optical subassembly for viewing an illuminated object plane, wherein the illumination assembly includes a base member having an imaging window formed therethrough, a light source attached to the base member in a plane substantially coplanar with the imaging window for projecting light upwardly away from the base member, and a non-mirrored reflector for redirecting light emitted from the light source back through the imaging window toward the object plane to illuminate the object plane. The non-mirrored reflector is positioned so as to house the light source and includes a central aperture for providing optical communication between the illuminated object plane and the optical subassembly. Preferably, the non-mirrored reflector defines a substantially closed illumination zone that is open only through the central aperture and the imaging window.

Use of indirect, reflected illumination off of a non-mirrored reflector solves the problems mentioned above with respect to direct and indirect/mirrored illumination systems, in that indirect illumination off of a non-mirrored reflector allows for more uniform, diffuse lighting across the entire field of view to be imaged. Thus, there are no areas of excessive illumination that would otherwise deteriorate the quality of the viewed image. Moreover, use of a non-mirrored diffuse reflective surface rather than a mirrored reflective surface avoids capture by the imager of a mirrored image of the imager and/or the light source. This is particularly important when imaging objects formed on reflective surfaces.

In a preferred embodiment of the present invention, the light source includes a plurality of LEDs, more preferably, white LEDs. Use of white LEDs solves another one of the above-discussed problems with prior art illumination systems, in that white LEDs allow for the imaging of all non-white colored objects.

In a preferred embodiment of the invention, the central aperture is large enough to allow the optical subassembly to move axially in and out of the reflector through the central aperture, to thereby allow for variable magnification of the illuminated object plane.

In another preferred embodiment, the non-mirrored reflector includes an upper discrete portion adapted to be fixed to the optical subassembly, and a lower discrete portion, and the upper portion rides within and is movable axially relative to the lower portion, to thereby allow for variable magnification of the illuminated object plane. Alternatively, the upper portion rides outside the lower portion.

As used herein, the term "non-mirrored" is used to define a surface that diffuses light to such an extent that any light reflected therefrom will not provide an image that is clearly discernable when captured by the imager. For example, the non-mirrored reflector described above will not allow clearly discernable images of the imager and/or the light source to be reflected back into the imager.

BRIEF DESCRIPTION OF THE DRAWING

For a fuller understanding of the nature and objects of the invention, reference should be made to the following detailed description of a preferred mode of practicing the invention, read in connection with the accompanying drawings, in which.

DETAILED DESCRIPTION OF THE PREFERRED EMBODIMENT

Figure 1:
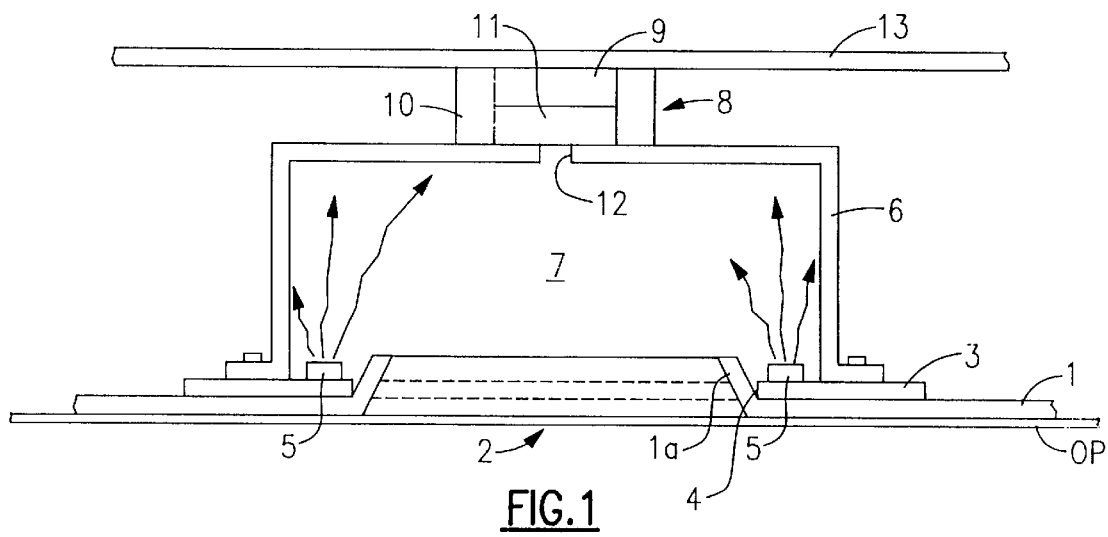
FIG. 1 is a diagrammatic cross-sectional view of an illumination assembly according to one embodiment of the present invention.

FIG. 1 shows one embodiment of the illumination assembly according to the present invention. The assembly includes a base plate 1 having a window 2 formed therethrough. An upwardly extending sidewall 1a of base plate 1 defines the periphery of window 2. The shape of window 2 is not limited, although quadrangular (e.g., square) is preferred.

An LED board 3 having a window 4 formed therethrough is positioned on the upper surface of base plate 1, such that window 4 aligns with window 2. Sidewall 1a acts as a guide seat for window 4, to provide correct alignment between base plate 1 and LED board 3. LED board 3 can be fixed to base plate 1 by any known means, such as thermal deformation of plastic rivets extending upwardly from the base plate through the LED board.

A plurality of LEDs 5 are mounted on LED board 3 and emit light upwardly away from base plate 1. A non-mirrored reflector 6 is positioned so as to house LEDs 5 and window 2. When base plate 1 is placed adjacent an object plane OP to be imaged, a substantially closed illumination zone 7 is created. Preferably, base plate 1 is positioned directly on the object plane OP such that the object plane itself helps define closed illumination zone 7.

The inside surface of reflector 6 preferably is white, to provide uniform, diffuse illumination throughout illumination zone 7. As a result, the area of object plane OP exposed through window 2 is illuminated indirectly by the illuminated inner surfaces of reflector 6. The shape of reflector 6 is not limited so long as it can provide a substantially closed illumination zone 7 when base plate 1 is placed on object plane OP. The cross-sectional shape of reflector 6, viewed in a plane parallel to OP, preferably is the same shape as imaging window 2 from the standpoint of manufacturing ease.

An optical subassembly 8 is mounted to the top of reflector 6, and preferably includes a solid state imager 9 disposed in a lens cell socket 10. The solid state imager 9 preferably is a CMOS camera, although any known imaging means could be used. One example of a color CMOS imager is OV6023, manufactured by Omni Vision Technologies, Inc.

The lens cell socket 10 includes the necessary optics 11 to allow imager 9 to "see" and capture images on the object plane. The reflector 6 includes a central aperture 12 formed therethrough to provide optical communication between imager 9 and object plane OP.

It should be understood that LED board 3 could be omitted and LEDs 5 could be mounted directly on the top of base plate 1. Alternative light sources could also be used, as long as they are mounted to direct light upwardly away from base plate 1 to illuminate the inside surfaces of reflector 6, and thus illuminate indirectly that portion of the object plane exposed through imaging window 2.

Additionally, imager 9 would be disposed of altogether when employing the present illumination assembly in an optical microscope, or like device, where the illuminated image will be viewed by the human eye.

Figure 2:
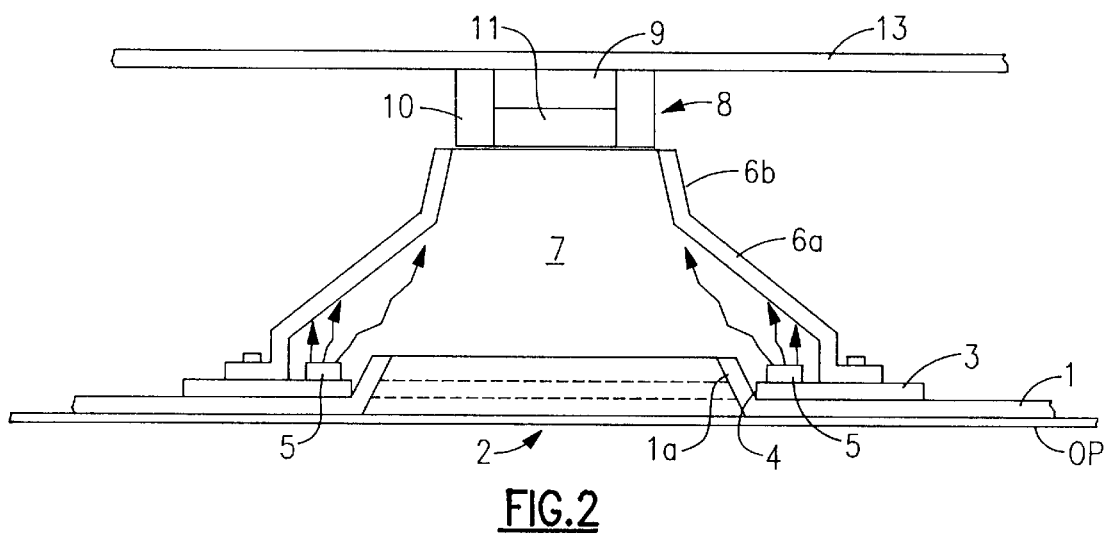
FIG. 2 is a diagrammatic cross-sectional view of an illumination assembly according to another embodiment of the present invention.

FIG. 2 shows another embodiment of the illumination assembly of the present invention. In this embodiment reflector 6 includes slanted side walls 6a, 6b. The lower slanted side wall 6a helps to reflect diffuse light back through window 2 onto the object plane. The upper slanted side wall 6b corresponds in shape and size to lens socket 10. It is possible to allow axial movement of lens socket 10, and accordingly, imager 9, in and out of the upper portion of reflector 6, so as to change the magnification level of the imager. In the case of FIG. 2, the outer dimensions of lens socket 10 should approximate the inner dimensions of central aperture 12 to provide a substantially closed illumination zone 7 when base plate 1 is placed on object plane OP.

Figure 3:
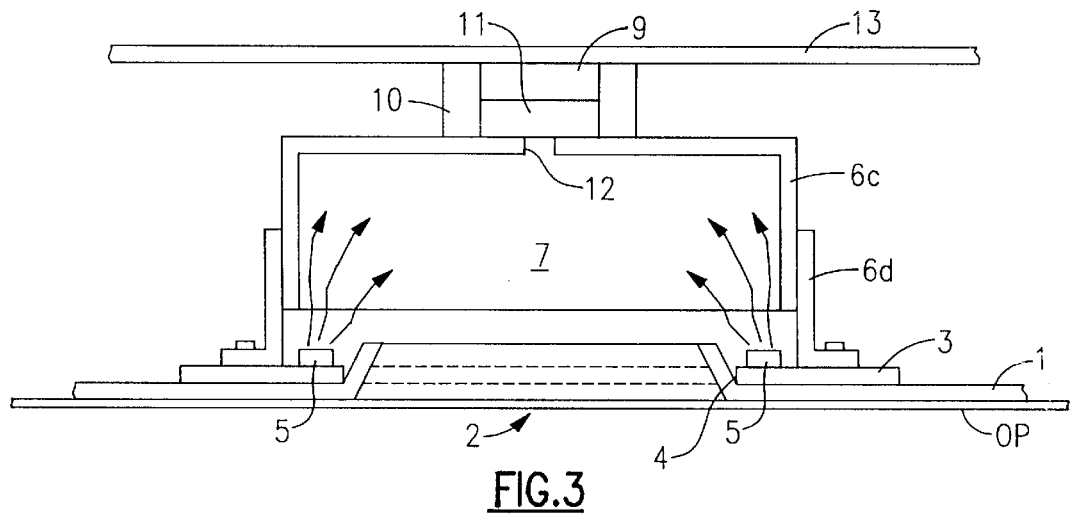
FIG. 3 is a diagrammatic cross-sectional view of an illumination assembly according to yet another embodiment of the present invention.

FIG. 3 shows another example of how the reflector 6 could be designed to accommodate variable magnification devices (i.e., axial movement of imager 9 and lens socket 10). In FIG. 3, reflector 6 is divided into upper section 6c and lower section 6d, wherein upper section 6c rides within lower section 6d. Preferably, lens socket 10 is fixed to the upper surface of upper portion 6c so that upper portion 6c moves axially along with lens socket 10.

The axial heights of the upper and lower sections of reflector 6 are selected to be greater, collectively, than the maximum axial displacement of imager 9/lens socket 10. This insures that a closed-side reflector is maintained at all magnification levels.

Figure 4:
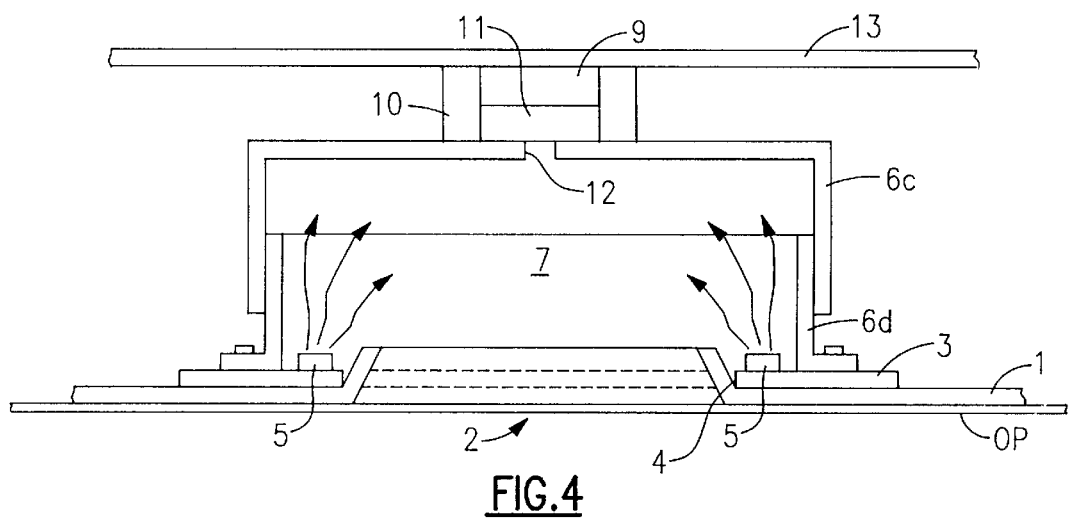
FIG. 4 is a diagrammatic cross-sectional view of an illumination assembly according to still yet another embodiment of the present invention.

FIG. 4 shows a similar reflector design to that of FIG. 3, except that upper section 6c rides on the outside of lower section 6d.

In all embodiments that provide variable magnification, it is preferred that imager 9 and lens socket 10 are mounted on an imager board 13 that is supported in the device to maintain a parallel arrangement between imager board 13 and base plate 1.

There are no limitations on the types of materials that could be used to make the various component parts described herein. However, from a manufacturing standpoint, aside from the optical, imager and light source components, most if not all of the remaining component parts preferably are made of plastic.

While the present invention has been particularly shown and described with reference to the preferred mode as illustrated in the drawings, it will be understood by one skilled in the art that various changes in detail may be effected therein without departing from the spirit and scope of the invention as defined by the claims.

What is claimed is:

1. An illumination assembly for an optical viewing device that includes an optical subassembly for viewing an illuminated object plane, said illumination assembly comprising:

a base member having an imaging window formed therethrough;

a light source fixed to said base member in a plane substantially coplanar with said imaging window for projecting light upwardly away from said base member; and a non-mirrored reflector for redirecting light emitted from said light source back through said imaging window toward the object plane to illuminate the object plane.

2. The illumination assembly of claim 1, wherein said non-mirrored reflector comprises a central aperture for providing optical communication between the illuminated object plane and the optical subassembly.

3. The illumination assembly of claim 2, wherein said non-mirrored reflector defines a substantially closed illumination zone open only through said central aperture and said imaging window.

4. The illumination assembly of claim 2, wherein said central aperture is large enough to allow the optical subassembly to move axially in and out of said reflector through said central aperture, to thereby allow for variable magnification of the illuminated object plane.

5. The illumination assembly of claim 1, wherein said non-mirrored reflector comprises inwardly inclining side walls extending upwardly from said base member.

6. The illumination assembly of claim 1, wherein said non-mirrored reflector comprises an upper discrete portion adapted to be fixed to the optical subassembly, and a lower discrete portion, and said upper portion rides within and is movable axially relative to said lower portion, to thereby allow for variable magnification of the illuminated object plane.

7. The illumination assembly of claim 1, wherein said non-mirrored reflector comprises an upper discrete portion adapted to be fixed to the optical subassembly, and a lower discrete portion, and said upper portion rides outside and is movable axially relative to said lower portion, to thereby allow for variable magnification of the illuminated object plane.

8. The illumination assembly of claim 1, wherein said light source comprises a plurality of LEDs.

9. The illumination assembly of claim 8, wherein said LEDs are white LEDs.

10. The illumination assembly of claim 8, wherein said LEDs are positioned around the periphery of said imaging window and emit light upwardly away from said imaging window.

11. An illumination assembly for an optical viewing device that includes optical viewing means for viewing an illuminated object plane, said illumination assembly comprising:
   a base member having an imaging window formed therethrough;
   illumination means for illuminating an object plane, said illumination means being fixed to said base member in a plane substantially coplanar with said imaging window and projecting light upwardly away from said base member; and
   non-mirrored reflection means for redirecting light emitted from said illumination means back through said imaging window to illuminate the object plane.

12. The illumination assembly of claim 11, wherein said non-mirrored reflection means comprises a central aperture for providing optical communication between the illuminated object plane and the optical viewing means.

13. The illumination assembly of claim 12, wherein said non-mirrored reflection means defines a substantially closed illumination zone open only through said central aperture and said imaging window.

14. The illumination assembly of claim 12, wherein said central aperture is large enough to allow the optical viewing means to move axially in and out of said reflection means through said central aperture, to thereby allow for variable magnification of the illuminated object plane.

15. The illumination assembly of claim 11, wherein said non-mirrored reflection means comprises inwardly inclining side walls extending upwardly from said base member.

16. The illumination assembly of claim 11, wherein said non-mirrored reflection means comprises an upper discrete portion adapted to be fixed to the optical viewing means, and a lower discrete portion, and said upper portion rides within and is movable axially relative to said lower portion, to thereby allow for variable magnification of the illuminated object plane.

17. The illumination assembly of claim 11, wherein said non-mirrored reflection means comprises an upper discrete portion adapted to be fixed to the optical viewing means, and a lower discrete portion, and said upper portion rides outside and is movable axially relative to said lower portion, to thereby allow for variable magnification of the illuminated object plane.

18. The illumination assembly of claim 11, wherein said illumination means comprises a plurality of LEDs.

19. The illumination assembly of claim 18, wherein said LEDs are white LEDs.

20. The illumination assembly of claim 18, wherein said LEDs are positioned around the periphery of said imaging window and emit light upwardly away from said imaging window.

21. An illumination assembly for an optical viewing device that includes an optical subassembly for viewing an illuminated object plane, said illumination assembly comprising:
   a base member having an imaging window formed therethrough;
   an LED board positioned on an upper surface of said base member, said LED board having an opening in alignment with the opening formed in said base member and a plurality of white LEDs positioned on said board to emit light upwardly in a direction away from said base member; and
   a reflector positioned above said LED board, said reflector comprising a non-mirrored reflective surface for reflecting light emitted by said white LEDs back through the imaging window to illuminate the object plane, said reflector further comprising a central aperture for providing optical communication between the illuminated object plane and the optical subassembly.

22. The illumination assembly of claim 21, wherein said reflector defines a substantially closed illumination zone open only through said central aperture and said imaging window.

23. The illumination assembly of claim 21, wherein said reflector comprises inwardly inclining side walls extending upwardly from said base member.

24. The illumination assembly of claim 21, wherein said reflector comprises an upper discrete portion adapted to be fixed to the optical subassembly, and a lower discrete portion, and said upper portion rides within and is movable axially relative to said lower portion, to thereby allow for variable magnification of the illuminated object plane.

25. The illumination assembly of claim 21, wherein said reflector comprises an upper discrete portion adapted to be fixed to the optical subassembly, and a lower discrete portion, and said upper portion rides outside and is movable axially relative to said lower portion, to thereby allow for variable magnification of the illuminated object plane.

* * * * *